United States Patent

[11] 3,624,478

[72] Inventors Johann Schwab
Vienna;
Helmut Blaha, both of Vienna, Austria
[21] Appl. No. 69,492
[22] Filed Sept. 3, 1970
[45] Patented Nov. 30, 1971
[73] Assignee SEMPERIT Osteneichisch-Amerikanische Gummiwerke Aktiengesellschaft
Vienna, Austria
Continuation of application Ser. No. 697,466, Jan. 12, 1968, now abandoned. This application Sept. 3, 1970, Ser. No. 69,492

[54] BINARY CONTROL CIRCUIT FOR MOLD-FILLING DEVICE
3 Claims, 4 Drawing Figs.

[52] U.S. Cl. .......... 318/470
[51] Int. Cl. .......... H02p 3/04
[50] Field of Search .......... 318/466, 468, 470, 483, 449

[56] References Cited
UNITED STATES PATENTS

| | | | |
|---|---|---|---|
| 3,213,715 | 10/1965 | Arenson .......... | 318/470 X |
| 3,307,095 | 2/1967 | Redmond, Jr. .......... | 318/483 |
| 3,344,330 | 9/1967 | Belanich et al. .......... | 318/466 X |
| 3,402,478 | 9/1968 | Hetrick .......... | 318/483 X |

*Primary Examiner*—Bernard A. Gilheany
*Assistant Examiner*—W. E. Duncanson, Jr.

ABSTRACT: The binary control circuit comprises a series of "OR" gates the first inputs of which are connected to a corresponding series of proximity sensors. The sensors are activated by the approach of sensor controlling members arranged according to a predetermined binary code. The second inputs of the "OR" gates are connected to a corresponding chain of bistable stages of a binary counter. The outputs of respective "OR" gates are connected to corresponding inputs of an "AND" gate. The binary counter is fed by a continuous train of pulses from a pulse generator. As soon as the binary number on the bistable counter stages equals to a complementary number of the predetermined code, all inputs of the "AND" gate are under a signal and the "AND" gate releases an output control signal that stops the mold filling operation.

BINARY CONTROL CIRCUIT FOR MOLD-FILLING DEVICE

This is a continuation of application Ser. No. 697,466 filed Jan. 12, 1968, now abandoned.

The invention relates to a circuit arrangement for the control of the period of operation of an electromotor, and relates more particularly to a control circuit for stopping of a pump for pressure-casting material.

It is conventional to use mechanical or electronic preselection counters for the control of drives. However, if the drive has to be changed in order to conform it to special operating requirements, manual shifting of these preselection counters is necessary. Such preselection counters are, for instance, used in the production of rubber soles where shifting of the drive must be possible, since different amounts of casting material must be conveyed by the pump into the individual casting molds which are needed in the production of soles of different sizes. It should be noted that in this example the casting molds are transported, by means of a conveyor, to the pressure nozzle which delivers to the mold the amount of casting material predetermined by a preselection counter. Then the next mold, for instance for a sole of different size, is brought to the pressure nozzle and filled with material. Thus it will be understood that control of the feed material must be constantly provided in order to obtain continuous operation.

In accordance with the invention a circuit arrangement is provided for automatic control of the period of operation of an electromotor as required for each mold, according to the quantity of material needed for the soles to be made in that mold. The circuit arrangement serves particularly for stopping the pump for feeding the material into the mold.

In accordance with the invention this is attained by providing a series of "OR" circuits, each first input of which is coupled to a corresponding series of proximity sensors; positioned adjacent a mold at filling position and activated by sensor control members arranged according to a predetermined binary code on the mold. Each second input to be energized from the output of an assigned bistable stage of a binary counter chain. The outputs of the series of "OR" circuits are fed to the corresponding inputs of an "AND" circuit, the output signal of which stops the electromotor.

Counter and circuit arrangements are conventional, wherein two counters are united in a circuit and used in a "-digital analog" manner, or by means of which the current count of a number of revolutions—for instance, for balancing the load variations of a motor—is effected by a signal action.

A drive has also become conventional which is controlled by means of a binary counter and a decoding system which renders every impulse effective.

According to this invention, however, a binary selection of the binary counter is effected without decoding, and the impulses are again selected as impulses; but, the combination of a series of "OR" circuits with an "AND" circuit over a binary counter chain and a series of coding proximity sensors; is not employed to control the speed of a drive, but rather to stop the drive after a certain desired number of impulses have been counted. This desired number of pulses is defined by the binary number resulting on the binary counter chain and corresponding to the complement of a predetermined code in the form of a binary number on the inputs of the "AND" gate, to a fully loaded state on these inputs. This code number is determined by the proximity sensor control members, as it will be explained later.

It is preferred to direct the counting impulses derived from the drive to the first bistable stage of the binary counter chain, according to the invention. For that, there is provided an impulse generator and shaper between the drive and the counter chain, to serve as an impulse generator to the first step of the counter chain. Thus the shaft of the driving means may, for instance, carry a disk provided with a preselected number of radially projecting flags, which during the course of the drive serve as a magnetic armature to pass through the slot of a pulsing magnet the output of which as a pulse is fed to the input of the first counting stage of the counter chain. The control pulse feeders assigned to the "OR" circuits are preferably contactless proximity detecting devices, preferably a coded position arrangement of removable electrically conductive members adapted for activating juxtaposed proximity sensors. These proximity sensors may operate on capacitive or inductive principle. These proximity sensors may be, of course, contact devices as well, such as limit stop switches, for instance.

When the circuit arrangement is used for the control of a pump that is to feed casting material into movable casting molds, the molds may be provided with the aforementioned removable conductive members which are arranged according to a predetermined binary code and; located to be opposite the proximity sensors. The outputs of respective proximity sensors are connected to corresponding; inputs to the "OR" circuits.

The casting molds may thus, for instance, be provided on their under side with extending electrically conducting bolts whose end faces serve as capacitor plate surfaces for the contactless actuation of the proximity sensors. The arrangement of the bolts is based on a predetermined binary code.

One object of this invention is to provide a novel circuit arrangement which makes it possible to control according to a predetermined binary code the period of operation of a device, preferably of an electromotor of a pump for a mold filling equipment.

Another object of this invention is to provide replaceable sensor control members which can be arbitrarily arranged on the bottom surface of the mold to form the desired binary code number, and thus to activate the corresponding proximity sensors in a juxtaposed series of sensors when the mold is placed in its filling position.

Still another object of this invention is to provide a simple logic circuitry which can release a controlling output pulse in response to the completion of a critical number of pulses from a continuous train of input pulses. This critical number is to be determined directly by the input binary code on the mold, without the use of any decoding means.

The objects and features of the invention are described in the following specification together with the drawings, in which FIG. 1 is a block wiring diagram of a circuit arrangement in accordance with the invention for the control of a pump serving to feed casting material into molds for soles;

Figure 1:
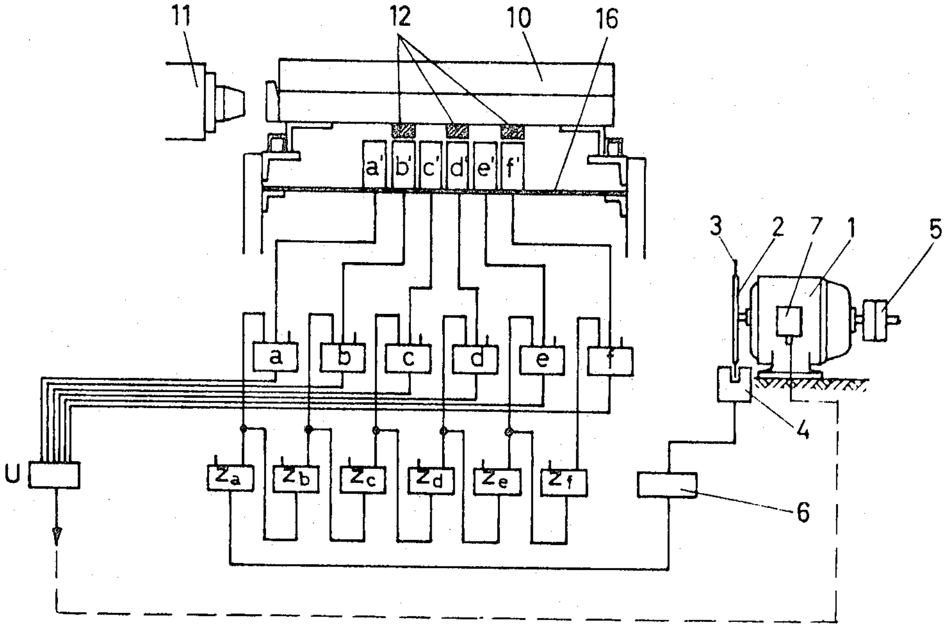

FIG. 1 shows a series of "OR" circuits *a* to *f*; one input of each "OR" circuit is fed from the output of an assigned proximity sensor *a'* to *f'*, and the other input of which is fed from the output of an assigned bistable stage of binary counter chain $Z_a$ to $Z_f$. The outputs of all the "OR" circuits are connected to corresponding inputs of an "AND" circuit U; the output of the "AND" circuit controls by means of a switch box 7 a motor 1 which drives a clutch 5 to a pump for the casting material. The first stage $Z_a$ of the counter chain receives a continuous train of pulses derived from the motor drive 1, the shaft of which supports a disk 2 provided on its periphery with flags or armatures 3 which during rotation of the shaft pass through a slot of a pulse-generating magnet 4. Between the pulse generator 4 and the first stage $Z_a$ of the counter chain there is disposed a conventional pulse shaper 6.

The sensors *a'–f'*, the outputs of which are fed to the first inputs of the "OR" circuits *a–f*, in the present example, are formed as proximity approach sensors, which means that their output signal depends on whether a binary coded electric marking such as a set of conductive bolts 12, for example,; is opposite the selected sensors of the series of proximity sensors *a'* to *f'*;

The individual casting molds 10 for the shoe soles are transported, for example, by means of a conveyor, to a pressure nozzle 11. The molds are provided on their undersides with the conductive bolts 12 arranged in series according to a predetermined binary code. As seen in FIG. 1, three bolts 12; are situated opposite the inputs of the sensors $b'$, $d'$ and $f'$ *which are activated by the bolts 12 while the mold 10 is in the position for being filled with casting material. As a result, parallel signals corresponding to a binary code pattern* 010101 will be applied through the assigned "OR" circuits to corresponding inputs of the "AND" circuit.

Figure 3:
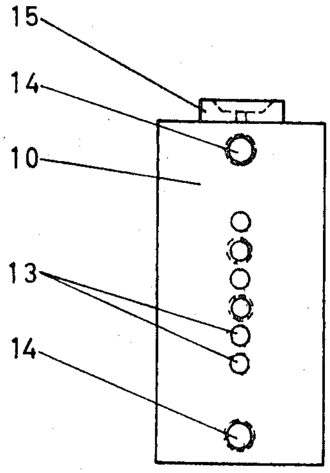
FIG. 3 is an underside elevational view of a casting mold.
Figure 4:
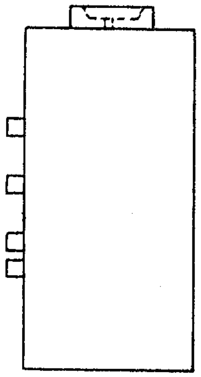
FIG. 4 is a side elevational view of a casting mold.

As shown in FIG. 3 of the drawing, in the present case, bores 13 are provided with threads into which metallic bolts 12 may be selectively screwed to serve as the coded markings. FIGS. 1 and 3 furthermore illustrate connecting bolts 14 and the pressure casting mold entrance 15 on the casting mold 10, as well as a mounting place 16 for holding the sensors $a'$-$f'$.

The operation of the arrangement is as follows:

As soon as the casting mold 10 is brought in its filling position opposite to the pressure nozzle 11, the motor 1 may be started by a suitable switch, whereupon the pump (not shown) transports casting material and fills the casting mold 10. Because of the fact that electrically conductive bolts 12; are situated opposite the inputs of the proximity sensors $b'$, $d'$ and $f'$, those sensor outputs show signals which are led to the first inputs of the "OR" circuits $b$, $d$ and $f$ and, therethrough, to the corresponding inputs of the "AND" circuit. Furthermore, by the activation of the motor 1, impulses are given off by the pulse generator 4. If, for instance, the disk 2 is provided with four initiator flags or armatures, one rotation of the shaft of the motor 1 effects the generation of four impulses. Thereby the counter chain composed of the bistable counting stages $Z_a$-$Z_f$ begins to count, and its outputs (see the impulse diagram of FIG. 2) are currently shifted to represent binary numbers of the counted pulses.

It is known that signals occur at the output of an "OR" circuit when one of its inputs is energized by a previously given signal. In the present example, due to the output signals of the sensors $b'$, $d'$ and $f'$ which are fed to the inputs of the "OR" circuits $b$, $d$ and $f$, there occur signals also at the outputs of these "OR" circuits which are led to the inputs of the "AND" circuit U where they produce a series of signals in the form of the binary number 101010. This binary number is a complement of the previously preset code number 010101 to fully loaded state 111111 on the inputs of the "AND" circuit.

As soon as corresponding signals are transmitted by the individual stages $Z_a$, $Z_c$ and $Z_e$ of the counterchain to the second inputs also of the "OR" circuits $a$, $c$ and $e$, all inputs of the "AND" circuit are provided with a signal, whereupon the "AND" circuit is activated and releases an output signal which in a suitable known manner stops the motor 1 and thereby the pump for the casting material.

It is thus evident that the motor 1 is controllable in relation to the arrangement of the bolts 12 on the underside of the casting mold which shows a code for the amount of casting material consumed.

Figure 2:
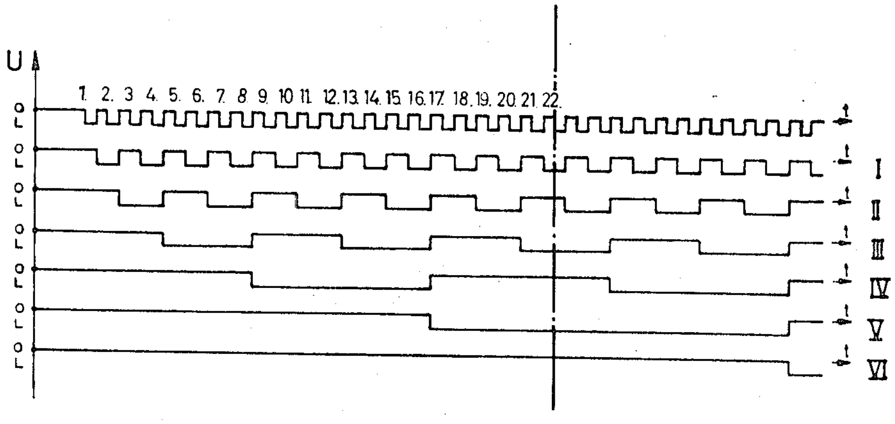
FIG. 2 is an impulse diagram of the counter chain of the circuit arrangement of FIG. 1.

The particular ratios for the example of FIG. 1 are explained in the impulse diagram of the counter shown in FIG. 2. The upper line illustrates the impulse series given off by the pulse shaper 6. The following lines I -VI indicated which signals occur upon a preceding impulse on the outputs of the individual counting stages $Z_a$ to $Z_f$. Prior to the 22nd impulse given off by the impulse shaper 6, the individual stages of the counterchain show, as seen from lines I to VI in FIG. 2, the binary number 101010; since the sensors $a'$ to $f'$ had produced the code number 010101, all "OR" circuits $a$ to $f$ are loaded with, for instance, a positive signal, whereby the "AND" circuit U is operated and stops the motor 1 and, respectively, terminates the pumping action of the pump.

It should be noted that in the scope the invention a number of modifications is possible. For instance, the number of flags or armatures 3 may be chosen at will. If twelve flags are provided, control may be reached with the accuracy of a twelfth of one revolution of the shaft.

Furthermore it is entirely within the scope of the invention to provide between the pulse generator 4 designated as a slot pulser and the first stage $Z_a$ of the counter chain, certain elements, for instance amplifiers, which effect a proper operation of the counter chain. The stages of the counterchain itself may be constructed as "bistable" multivibrators.

In the example illustrated, the arrangement is based on the binary system. It is also feasible to use a binary system changed into a decade system, whereby the readout may be effected by a digital vacuum tube. Furthermore, the connections of the individual "OR" circuits may be positioned at the covered or also at the noncovered outputs of the individual counting steps or rather the approach sensors, whereby only the respective changes in the code system are necessary.

It is also within the scope of the invention to replace the approach sensors which are controlled contact-free by other devices, for example by those that are controlled by contact.

The special advantage of the arrangement shown lies in the fact that contacts are avoided, whereby the machine needs almost no attendance and has a long life span.

A further modification may provide that the impulses conducted to the counter chain are not derived from the motor itself but from a separate independent impulse feeder. In contrast thereto, the special advantage of the arrangement illustrated is the fact that it needs no further means for assuring synchronism.

Finally it should be pointed out that the electric markings or capacitor plates may be variously provided.

Having thus described the invention, what we claim as new and desire to be secured by Letters Patent, is as follows:

1. A circuit arrangement for the control of the period of operation of a device, comprising a series of proximity sensors, a series of sensor control members, a series of "OR" circuits, each of said "OR" circuits having one input which is fed from the output of an assigned proximity sensor, said sensor control members occupying a binary coded position relative to said series of proximity sensors, a binary counter chain of bistable counting stages, each of said "OR" circuits further comprising a second input fed from the output of an assigned stage of said counter chain, an "AND" circuit having as many inputs as there are "OR" circuits, the outputs of all said "OR" circuits going to corresponding inputs of said "AND" circuit, pulse generator means coupled to the input of said binary counter chain, and means responsive to an output signal from said "AND" circuit to control the stopping of said device.

2. A circuit arrangement according to claim 1 characterized therein that said device is an electromotor for operating a pump for supplying pressure casting material into a mold, and the sensor control members assigned to the selected "OR" circuits respectively embody electroconductive activating pieces to cooperate with corresponding proximity sensors when said mold is operatively positioned to receive a filling charge.

3. A circuit arrangement according to claim 2, characterized in that the casting mold is provided on its underside with protruding electrically conducting bolts whose end faces serve as capacitor plate surfaces.

* * * * *